Figures 1, 2:
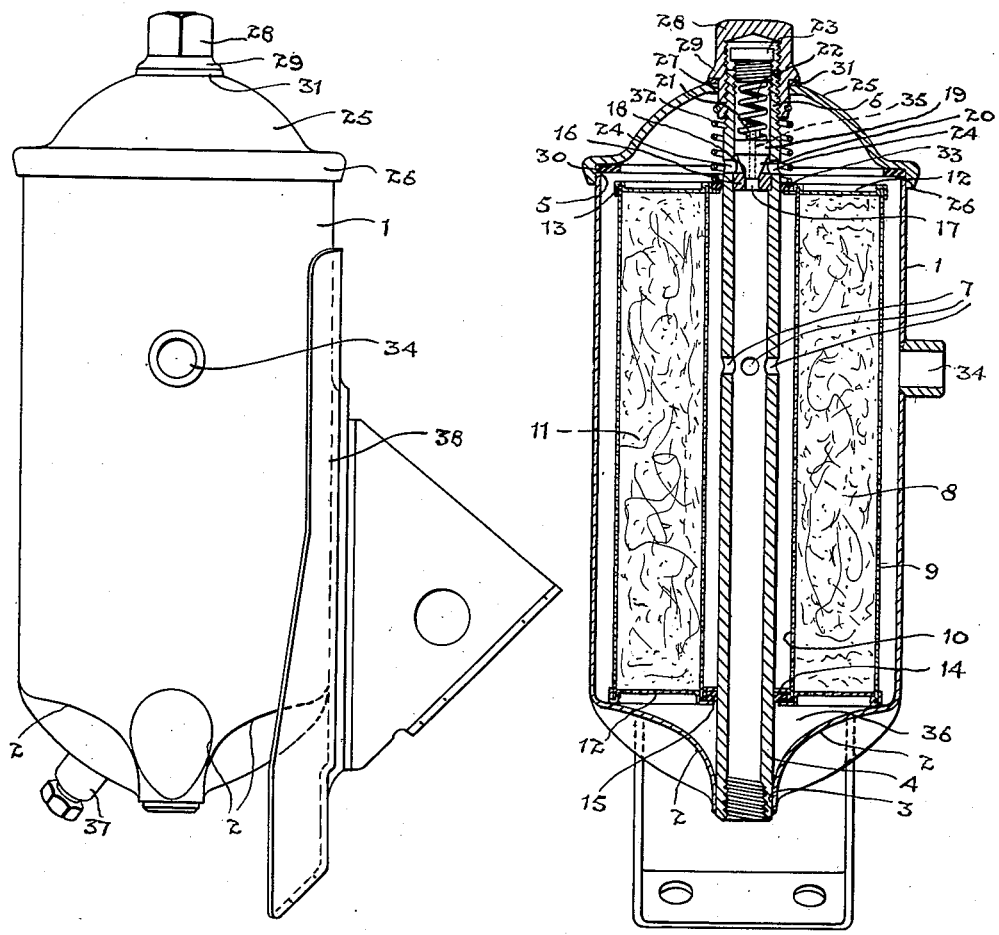

March 18, 1952 R. C. BECKETT 2,589,920
OIL FILTER
Filed Dec. 13, 1947

Inventor
Ronald C. Beckett
by Douglas S. Johnson
Agent

Patented Mar. 18, 1952

2,589,920

UNITED STATES PATENT OFFICE 2,589,920

OIL FILTER

Ronald Carey Beckett, Galt, Ontario, Canada, assignor to Kralinator Products Limited, Preston, Ontario, Canada Application December 13, 1947, Serial No. 791,498

2 Claims. (Cl. 210—131)

This invention relates to oil filters and more particularly to oil filters for use in pressure lubricated systems and the principal object of the invention is to provide an extremely simplified and reliable filter unit which will function effectively to filter foreign material from the oil but which will, upon rise of pressure in the unit beyond a predetermined permissible value due to increased circulating pressure or clogging of the filter element, automatically function to provide a by-pass passage circumventing the filter element until the pressure is reduced to prevent stoppage of circulation of the oil.

A further important object is to provide a readily manufactured and economical filter unit which will employ a filter cartridge which can be quickly and easily removed and replaced as a unit when its useful life is completed.

A further object is to provide a filter unit which can be adjusted to regulate the pressure under which it will function to provide a by-pass passage circumventing the filtering element.

A still further object is to provide a casing which will receive and support the filter cartridge without requiring the use of brackets or other holding means.

The principal feature of the invention consists in providing an oil filter unit having a ported return flow tube centrally arranged in a cylindrical casing and surrounded by a filtering medium to filter oil delivered under pressure to the casing and passing through the ports of the central return tube, the return tube being provided with a conical valve seat arranged above the filtering medium and with a spring-actuated conical valve slidably arranged therein for co-operation with the valve seat, openings being provided in the tube to provide communication between the casing and the interior thereof about the valve seat whereby oil entering the openings acts upon the conical periphery of the valve to exert an upward force thereon against its spring, the valve being adapted upon increased oil pressure in the casing beyond a predetermined permissible value to lift against its spring and to allow the oil to enter the central tube bye-passing the filtering medium.

A further feature consists in providing means for adjusting the spring pressure acting on the valve to regulate the pressure at which the valve will operate.

A further important feature consists in utilizing removable filter cartridge as the filtering medium.

A still further and important feature consists in forming the lower end of the casing with a plurality of circumferentially spaced concaved indents to define an internal seat to support the filter cartridge above a central sump arranged below the cartridge, and providing the casing with a removable cap held in place by a nut threaded onto the central return tube.

Referring to the accompanying drawings, Figure 1 is a side elevational view of my filter unit.

Figure 2 is a vertical mid-sectional view of my filter unit shown in Figure 1.

With reference to the accompanying drawings, my filter unit comprises a cylindrical casing 1 having the lower end provided with a plurality of circumferentially spaced concaved indents 2 terminating in a reduced central orifice 3 and secured in this orifice is a centrally located tube 4 which extends upwardly beyond the open upper end 5 of the casing and is provided with an externally threaded end 6.

Adjacent the center the tube is provided with ports 7 leading to the interior thereof, and surrounding the tube is a filter cartridge 8 in the form of an outer perforated cylindrical wall 9 and a concentric inner perforated cylindrical wall 10 having filtering material 11 packed therebetween.

The walls 9 and 10 are held in position by annular end discs 12 which are provided with annular grooves 13 to receive the ends of the walls.

The lower end plate or disc 12 has an annular angle member 14 secured to the inward side thereof adjacent the inner edge to form an annular channel to receive a gasket 15 of suitable compressible material.

Arranged in the tube 4 adjacent the upper end and immediately above the upper end of the filter cartridge 8 is a plug 16 provided with a central orifice 17 which tapers inwardly from its upper edge to form a tapered valve seat 18.

Slidably mounted in the tube 4 above the plug 16 is a valve 19 formed with a conical extension 20 to cooperate with the tapered valve seat 18.

Extending from the opposite end of the valve is a stem 21 which serves to locate a compression spring 22 arranged between the valve and a plug 23 threaded into the upper tube end 6.

The diameter of the valve 19 is of such a size to provide a snug sliding fit with the interior wall of the tube and the tube is provided with openings 24 arranged in the wall thereof immediately above the plug 16 to provide communication between the casing 1 and the tube interior.

Fitting on the upper end of the cylinder 1 is a cap member 25 having a downturned edge flange 26 arranged to extend over the cylinder or casing end. The central portion of the cap member 25 is arched upwardly and is provided with a central orifice or opening 27 through which the tube 4 extends, and a nut 28 having an annular flange 29 intermediate its length is threaded on to the threaded tube end 6 so that its flange is brought into engagement with the cap member 25 to force same downwardly against the end of the casing 1 into locking position.

To ensure a liquid-tight fit between the cap member 25 and the casing a suitable gasket 30 is interposed beneath the cap and a washer 31, preferably of copper, is interposed between the nut flange 29 and the upper surface of the cap.

To ensure that the filter cartridge 8 is held down firmly against the seat as formed by the indents 2 the nut 28 carries a compression spring 32 secured thereto and extending downwardly to engage and compress a suitable gasket 33 which surrounds the central tube 4 and bears on the upward cartridge disc 12.

In operation oil enters the casing 1 under pressure through a suitable inlet 34 and, after passing through the perforated cartridge walls 9 and 10 and inervening filtering material 11, enters the port 7 in the central tube as clean oil and is conveyed away through the lower end of the tube.

The gaskets 15 and 33 located at the ends of the filter cartridge ensure that under normal operation none of the dirty oil entering the inlet 34 enters the space between the central tube 4 and the inner cartridge wall 10 without first passing through the filtering media where the sludge and deposits carried are removed.

In the event the filter cartridge becomes plugged or the oil is delivered into the casing 1 under excessive pressure the oil will not penetrate through the filter cartridge with sufficient rapidity to maintain the proper flow out the lower end of the central tube and hence an abnormal pressure will be built up in the casing.

Since the oil in the casing has free access to the annular cuneiform chamber defined within the interior of the central tube 4 above the valve seat 18 through the openings 24, a pressure will be exerted on the conical thrust face of the conical valve extension 20, and this pressure may be resolved into an upward force tending to lift the valve 19 off its seat against the action of the spring 22.

When the pressure in the casing 1 exceeds a predetermined value, which is dependent upon the compression force of the spring and the angle of the conical face of the valve extension 20, the valve will lift allowing the oil from the casing to flow through the opening 17 in the plug 16 into the interior of the tube 4 and out the lower end thereof to preclude any possibility of a stoppage of the oil circulation.

In the arrangement shown with the upper plug 23, against which the upper end of the compression spring 22 abuts, threaded into the tube end 6, an adjustment of the compression force of the spring 22 may be made by rotation of the plug 23 to a different position. Thus a control of the pressure required to open the valve 19 is provided.

In the event that oil entering the upper end of the tube 4 through the openings 24 leaks past the valve 19 into the chamber formed between the upper face of the valve and the upper plug 23, I provide a central orifice 35 through the valve through which the trapped oil may escape into the lower portion of the central tube.

It will be appreciated that with the shape of the casing 1 provided with the contracted end the filter cartridge 8 can be quickly inserted into position and will rest on the indents 2 which form a seat to support the cartridge above a sump 36 where the heavier waste materials which sink down between the indents 2 collect and are removed through the drain opening 37.

With this arrangement no separate brackets or other holding devices for supporting a filter cartridge need be provided and the spring 32 serves to securely hold the filter cartridge firmly against the lower casing end 2.

The whole element may be mounted on any suitable support, such as indicated at 38.

From the foregoing it will be appreciated that my filter unit can be readily and economically manufactured and can be quickly and readily assembled, and when it is necessary to replace the filter element it will be an extremely simple matter to remove the cap member, replace the filter element and replace the cap. Thus by having the filter element removable and of a relatively inexpensive construction my filter unit can be used indefinitely and the filter elements changed as frequently as required to ensure proper filtering at an extremely low cost.

While my filter unit is particularly adapted for filtering oil in forced lubricating systems, other liquids may be filtered using the principle of my unit and without departing from the scope of my invention.

What I claim as my invention is:

1. In an oil filter unit, a longitudinally upright casing having an oil inlet opening in the wall thereof, a vertical tube centrally arranged in and extending longitudinally of said casing and communicating at its lower end with the exterior of said casing to provide an oil outlet and having an upper end threaded interiorly and exteriorly, a cap engaging the threaded exterior of said tube to seal the upper end thereof, a filter cartridge surrounding said tube with the ends of said cartridge in sealing contact with said tube, said tube having ports therein between the ends of said cartridge, a valve seat arranged in said tube adjacent the upper end of said cartridge, a conical valve member slidably arranged in said tube above said valve seat to seat thereagainst and formed to have a close sliding fit at its maximum diameter with the interior of said tube to define an annular variable chamber of cuneiform section above said valve seat with the inner wall thereof defined by said conical valve presenting an angular upwardly diverging thrust surface, the outer wall of said chamber defined by said tube having ports therein to establish a pressure oil wedge in said chamber acting on said angular thrust surface to lift said valve under force of the vertical resolution of the force of said oil wedge against said angular thrust surface, an adjustable plug threaded into the upper end of said tube, and a spring interposed between said adjustable plug and valve and urging said valve against said valve seat, said valve being provided with a bleed orifice therethrough.

2. An oil filter unit comprising an upright cylindrical casing having an inlet opening therein, an open upper end and a lower end formed with a plurality of circumferential spaced indents defining a seat above an oil sump, a vertical tube centrally arranged in and extending longitudinally of said casing, said tube projecting at its upper end above the open upper end of said casing and communicating at its lower end with the exterior of said casing, a removable cap closing said upper casing end and having an opening therein through which said upper tube end extends, said upper tube end being interiorly and exteriorly threaded, a second cap engaging the threaded exterior of said tube to seal said tube and to engage the aforesaid cap to seal the opening therein while clamping said cap in casing-closing relation, a valve seat arranged in said tube adjacent the upper end thereof, a conical valve arranged in said tube between said second cap and valve seat and snugly fitting said tube at its upper end and presenting a conical surface above said valve seat, an adjustable plug threaded into the upper end of said tube above said valve, a spring interposed between said adjustable plug and valve, a cylindrical filter element enclosing the central portion of said tube and seating on said seat defined by said indents and engaged in sealing contact at the ends with said tube, spring means for holding said filter element against said indents, said tube having ports arranged in the portion enclosed by said filter element and the portion immediately above said valve seat to permit oil under pressure to enter said tube from said casing and act against the conical surface of said valve to exert a force determined by the pressure of said oil and conicity of said presented valve surface.

RONALD CAREY BECKETT.

REFERENCES CITED

The following references are of record in the file of this patent:

UNITED STATES PATENTS

| Number | Name | Date |
|---|---|---|
| 1,002,905 | Dronsfield | Sept. 12, 1911 |
| 1,036,479 | Flamm | Aug. 20, 1912 |
| 1,162,153 | Gensceimer | Nov. 30, 1915 |
| 2,188,745 | Wagner | Jan. 30, 1940 |
| 2,454,030 | Besore | Nov. 16, 1948 |
| 2,478,109 | Kamrath | Aug. 2, 1949 |

FOREIGN PATENTS

| Number | Country | Date |
|---|---|---|
| 316,452 | Great Britain | Aug. 1, 1929 |
| 533,576 | Great Britain | Feb. 17, 1941 |